Figure 1:
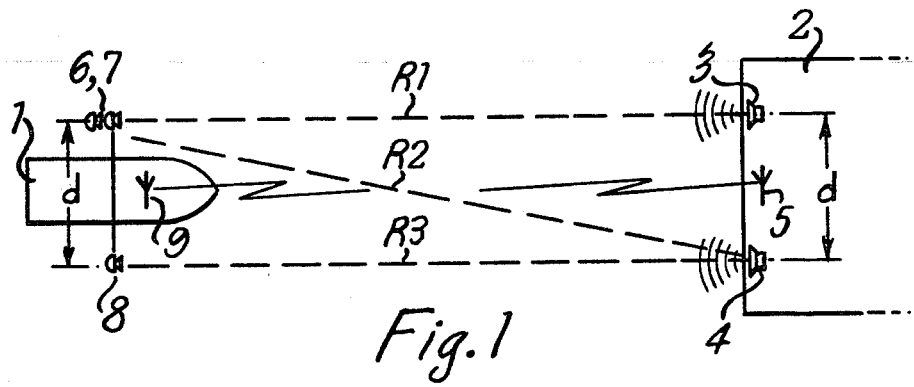

United States Patent [19]

Passey

[11] 4,207,571

[45] Jun. 10, 1980

[54] NAVIGATIONAL AIDS

[75] Inventor: Ronald W. Passey, Brentford, England

[73] Assignee: S. Davall & Sons Limited, Greenford, England

[21] Appl. No.: 887,100

[22] Filed: Mar. 16, 1978

[30] Foreign Application Priority Data

Mar. 29, 1977 [GB] United Kingdom ............... 13147/77

[51] Int. Cl.² ........................... G01S 5/14; G01S 5/18
[52] U.S. Cl. ........................... 343/112 R; 343/112 D; 367/124
[58] Field of Search ..................... 343/112 R, 112 D; 340/6 R, 16 R

[56] References Cited

U.S. PATENT DOCUMENTS 2,910,665 10/1959 Hawkins ..................... 343/112 D X
4,055,830 10/1977 Wilson et al. ................ 343/112 D X Primary Examiner—Maynard R. Wilbur
Assistant Examiner—Richard E. Berger
Attorney, Agent, or Firm—Pollock, Vande Sande & Priddy

[57] ABSTRACT

A navigational-aid apparatus and method involving the use, on a target station or a craft station, of at least two transmitters, separated by a base-line distance, of distinguishable sonic signals and a transmitter of radio or other electromagnetic signals and, on the craft station or the target station respectively, of three receivers for the sonic signals and a receiver for the electromagnetic signals, the receivers for the sonic signals being in two positions separated by a base-line distance, there being two receivers, one for each sonic signal, in one said position and a receiver for one of the said sonic signals in the other position, while the station having the said receivers is provided with timing means for determining the elapsed times between the reception of the electromagnetic signal and the reception of the respective sonic signals.

5 Claims, 4 Drawing Figures

NAVIGATIONAL AIDS

This invention concerns improvements relating to navigational aids, particularly close-quarter navigational aids. Generally, aids in current use suffer from the disadvantage that their accuracy, expressed as a percentage of the distance being measured, declines at short ranges. The present invention seeks to provide an aid to navigation, and a method of navigating or positioning a vessel, aircraft or vehicle (hereinafter termed a craft), which have characteristics particularly suitable for operation at short distances, for example within a range of 3 to 300 meters, but without limitation to those figures.

The navigational-aid apparatus and method of the invention depend upon the use simultaneously of electromagnetic and sonic links. As electromagnetic link, use will generally be made of a radio signal link, but other signals within the electromagnetic spectrum may be employed, including light, infra-red and ultra-violet signals. Sonic links may be by gas or liquid transmission, in practice through air or water.

Navigational-aid apparatus in accordance with the invention comprises, on a target station or a craft station, at least two transmitters, separated by a base-line distance, of distinguishable sonic signals and a transmitter of electromagnetic signals and, on the craft station or the target station respectively, three receivers for the sonic signals and a receiver for the electromagnetic signals, the receivers for the sonic signals being in two positions separated by a base-line distance, there being two receivers, one for each sonic signal in one said position and a receiver for one of the said sonic signals in the other position, while the station having the said receivers is provided with timing means for determining the elapsed times between the reception of the electromagnetic signal and the reception of the respective sonic signals.

The electromagnetic and sonic signals may be produced by simultaneous switching of respective carriers or simultaneous modulation thereof to form repeated pulses. The information provided by the signals is then "updated" at each set of pulses.

Figure 2:
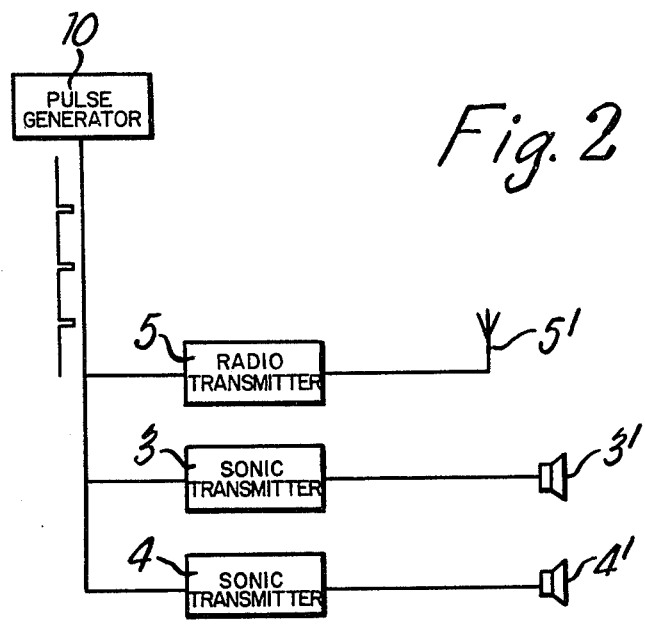
Figure 3:
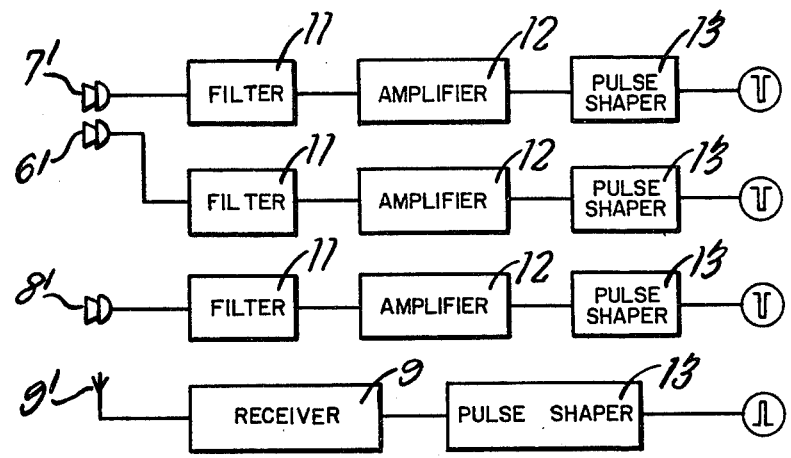
Figure 4:
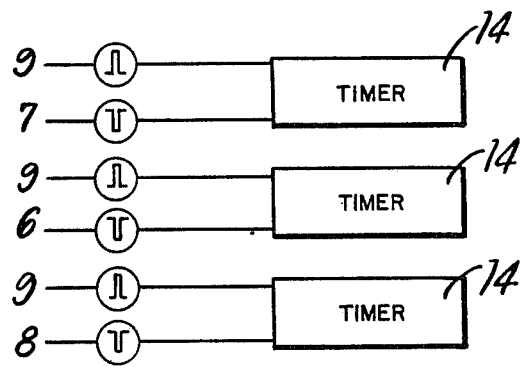

One manner of carrying the invention into effect will now be more fully described, by way of example, with reference to the accompanying diagrammatic drawings, in which:

FIG. 1 is a plan view showing an equipped craft approaching an equipped fixed object, FIG. 2 is a block diagram for a transmitting station, FIG. 3 a block diagram for a receiving station, and FIG. 4 a diagram for a simple form of timing or coding system.

For the purpose of this example, it will be assumed that the craft is a seaborne vessel 1, FIG. 1, to be navigated in relation to a fixed object or "target", such as the platform 2 of an offshore oil rig, a lighthouse, harbour installation, jetty or the like.

The target is provided with two transmitters 3 and 4, of distinguishable sonic signals, at a base-line distance d apart. Suitably the transmitters 3 and 4 transmit at 3 KHz and 5 KHz respectively and are separated by a distance d of 10 meters. The target is also provided with a radio transmitter 5.

The craft 1 has three sonic receivers in two positions, for instance 5 KHz and 3 KHz receivers 6 and 7 respectively in one position and a single 5 KHz receiver 8 in the other position, the base-line distance between the two positions being again, say, 10 meters. A radio receiver 9 is also provided on the craft 1.

The transmissions from both sonic transmitters 3 and 4 are received at the one position on the craft by the receivers 6 and 7, the ranges being R1 and R2 respectively. At the other position on the craft, only the one transmission, from 4, will be received by the receiver 8 at range R3. As will be understood, this combination will never permit of more than two transmitter/receiver paths of identical lengths. Often all three path lengths will be different. Any combination of path lengths (3–6, 4–7 and 4–8) indicated by the elapsed times between the arrival of the simultaneously transmitted radio signals and the respective arrivals of the sonic signals will describe a position and attitude of the craft. Theoretically, in any particular case, the elapsed times could be said to describe two positions at 180° with reference to the target as centre, but these separated positions could not be confused in normal practical navigation so that the information provided is unambiguous.

The sonic and radio transmissions may, as assumed in the following description, be used as carriers upon all three of which short signal pulses or "bursts" are simultaneously impressed. The pulse duration is suitably of the order of a few milliseconds and the pulse interval of the order of a few seconds, for instance a duration of 4 ms with a 1 second interval. FIG. 2 illustrates how a pulse generator 10 may be used to control the simultaneous transmission of signal pulses from the one radio transmitter 5 with aerial 5' and the oscillators of the sonic transmitters 3 and 4 with loud speakers 3', 4'.

At the receiving station (FIG. 3), the sonic signals received by microphones 6', 7', 8' of the receivers 6, 7, 8 are fed to filters 11, designed to pass only the signal respectively required, amplifiers 12 and pulse shapers 13. The radio signal from the receiver 9 is also fed to a pulse shaper 13. Depending upon the lengths of the paths R1, R2 and R3, the pulses from the sonic receivers will be differently time-displaced in relation to the pulse from the radio receiver. The shaping of the sonic pulses is such that they have opposite polarity to the radio pulse.

For obtaining a measure of each time displacement, the sonic pulses from the pulse shapers are fed (FIG. 4) as "stop" signals to respective digital or other electronic timers 14 or timing mechanism to which the radio pulse is fed as "start" signal.

The timers may be simply calibrated, for example, in terms of the time taken for sound to travel 1 foot in air, in which case 1 "count" is equal to 1 foot of range. Indications may be provided directly in length units. The three range readings may be integrated by well known means to produce a single range and bearing indication or a display presenting a plan position of the craft 1 in relation to the target 2.

As the above described operation is repeated on reception of each set of pulses by the receivers 6 to 9, the information provided is up-dated at very short intervals of time, i.e. every second with a pulse interval of one second. The pulse interval will be selected to suit particular requirements. A longer interval than one second may normally be required, as otherwise the maximum usable range of the apparatus could be unnecessarily limited by risk of incorrect responses at the extreme range.

A simple numerical example will serve to illustrate the order of times involved. Distances d of 10 meters and a range of 90 meters are assumed. The time taken by the radio signal to traverse the 90 meters is neglibibly short in relation to that required by the sonic signals, for which the velocity is about 1500 m/sec in water and considerably less in air. In water, the propagation of the signals along the direct paths 3-6 and 4-8 will take about 60 milliseconds and that of the signal along the oblique path 4-7 about 60.7 milliseconds. Such periods can be accurately determined by apparatus which is relatively simple and capable of being operated by persons of only moderate skill.

Conversion of measured time periods into distances will depend on the velocity of the sonic signals locally. The velocity may be determined by continuous monitoring on the craft or from a reference signal transmitted to the craft. On the craft, the velocity value may then be introduced into the timing system by automatically or manually adjustable means.

More than two sonic transmitters and three receivers may be employed and they may be disposed in combinations of positions other than that described above. In relation to what hasbeen described above, the locations of the transmitters and receivers on the target and craft may be reversed.

As shown in the example illustrated in FIG. 1, the receivers 6, 7 8 are disposed athwart the craft 1. For some purposes, use may be made of an array disposed longitudinally of a craft or of an adjustably disposed array.

In practice, the two sonic frequencies employed will preferably be selected from within a range of the order of from 2 to 10 KHz. The actual frequencies will be selected to be readily distinguishable, in which connection possible harmonic difficulties should be taken into account.

I claim:

1. Navigational-aid apparatus comprising, on a target station or a craft station, at least two transmitters, separated by a base-line distance, of distinguishable sonic signals and a transmitter of electromagnetic signals and, on the craft station or the target station respectively, three receivers for the sonic signals and a receiver for the electromagnetic signals, the receivers for the sonic signals being in two positions separated by a base-line distance, there being two receivers, one for each sonic signal, in one said position and a receiver for one of the said sonic signals in the other position, while the station having the said receivers is provided with timing means for determining the elapsed times between the reception of the electromagnetic signal and the reception of the respective sonic signals.

2. Apparatus according to claim 1, wherein the electromagnetic and sonic signals are produced by simultaneous switching of respective carriers to form repeated pulses.

3. Apparatus according to claim 1, wherein the electromagnetic and sonic signals are produced by simultaneously modulating respective carriers with repeated pulses.

4. A method of determining the relative position of a craft, which comprises transmitting simultaneously, from separate positions on a target or craft station, distinguishable sonic signals and an electromagnetic signal and receiving the sonic signals on the craft station or the target station respectively at two separate positions, both sonic signals being received at one position and one sonic signal at the other position, timing the reception of the sonic signals with reference to that of the electromagnetic signal, and determining from the timings three ranges from the first named two positions to the second named two positions, which three ranges define a position of the craft.

5. Navigational aid apparatus comprising:
transmitter means for simultaneously transmitting at least two distinguishable sonic signals separated by a transmitter base-line distance and a corresponding electromagnetic signal; and
receiver means disposed a variable distance from said transmitter means and having means for receiving said at least two distinguishable sonic signals at at least a first receiver position at at least one of said at least two distinguishable sonic signals and at least a second receiver position, said receiver positions separated by a receiver base-line distance, said receiver means further including means for receiving said electromagnetic signal and measuring the time delay between the reception of said electromagnetic signal and the reception of the distinguishable sonic signals at at least said first and second receiver positions, the respective time delays corresponding to distance ranges for defining the position of said receiver means with respect to said transmitter means.

* * * * *